United States Patent
Kumar et al.

(10) Patent No.: US 8,659,846 B2
(45) Date of Patent: Feb. 25, 2014

(54) INTER-TRACK INTERFERENCE CANCELATION IN THE PRESENCE OF FREQUENCY OFFSET

(75) Inventors: Naveen Kumar, San Jose, CA (US); Jason Bellorado, San Jose, CA (US); Marcus Marrow, San Jose, CA (US); Kai Keung Chan, Fremont, CA (US)

(73) Assignee: SK hynix memory solutions inc., San Jose, CA (US)

( * ) Notice: Subject to any disclaimer, the term of this patent is extended or adjusted under 35 U.S.C. 154(b) by 25 days.

(21) Appl. No.: 13/448,218

(22) Filed: Apr. 16, 2012

(65) Prior Publication Data
US 2013/0027801 A1    Jan. 31, 2013

Related U.S. Application Data

(63) Continuation-in-part of application No. 13/282,370, filed on Oct. 26, 2011.

(60) Provisional application No. 61/408,369, filed on Oct. 29, 2010, provisional application No. 61/480,930, filed on Apr. 29, 2011.

(51) Int. Cl.
*G11B 5/09* (2006.01)

(52) U.S. Cl.
USPC ............... 360/39; 360/42; 360/51; 360/55; 360/77.01

(58) Field of Classification Search
None
See application file for complete search history.

(56) References Cited

U.S. PATENT DOCUMENTS

| | | | |
|---|---|---|---|
| 4,513,333 A | 4/1985 | Young et al. | |
| 5,490,091 A | 2/1996 | Kogan et al. | |
| 5,729,514 A | 3/1998 | Horigome et al. | |
| 5,917,855 A | 6/1999 | Kim | |
| 6,580,676 B1 | 6/2003 | Yanagisawa et al. | |
| 6,909,566 B1 | 6/2005 | Zaitsu et al. | |
| 7,126,890 B2 | 10/2006 | Learned et al. | |
| 7,729,071 B2 | 6/2010 | Harada | |
| 8,300,339 B1 | 10/2012 | Nangare et al. | |
| 8,379,498 B2 * | 2/2013 | Mathew et al. | 360/51 |
| 2001/0000302 A1 * | 4/2001 | Sasamoto et al. | 360/31 |
| 2003/0031103 A1 | 2/2003 | Kuribayashi et al. | |
| 2003/0223330 A1 | 12/2003 | Kuribayashi et al. | |
| 2004/0037202 A1 | 2/2004 | Brommer et al. | |
| 2006/0077830 A1 | 4/2006 | Kanaoke | |
| 2007/0165326 A1 | 7/2007 | Berman et al. | |
| 2008/0151704 A1 | 6/2008 | Harada | |
| 2012/0020395 A1 | 1/2012 | Domanovitz et al. | |
| 2012/0063022 A1 | 3/2012 | Mathew et al. | |

* cited by examiner

*Primary Examiner* — Muhammad N Edun
(74) *Attorney, Agent, or Firm* — Van Pelt, Yi & James LLP

(57) ABSTRACT

An initial phase offset between a center track and a side track is determined. An initial side track pulse shape is determined using the initial phase offset and side track interference. The initial side track pulse shape minimizes a contribution of the side track interference to a center track bit. The contribution of the side track interference is removed from the center track bit using the initial side track pulse shape and the side track interference.

20 Claims, 7 Drawing Sheets

INTER-TRACK INTERFERENCE CANCELATION IN THE PRESENCE OF FREQUENCY OFFSET

CROSS REFERENCE TO OTHER APPLICATIONS

This application claims priority to U.S. Provisional Patent Application No. 61/480,930 entitled INTER-TRACK INTERFERENCE (ITI) CANCELATION IN PRESENCE OF FREQUENCY OFFSET FOR SHINGLED MAGNETIC RECORDING (SMR) filed Apr. 29, 2011, which is incorporated herein by reference for all purposes; this application is also a continuation in part of co-pending U.S. patent application Ser. No. 13/282,370 entitled INTER-TRACK INTERFERENCE CANCELATION FOR SHINGLED MAGNETIC RECORDING filed Oct. 26, 2011, which is incorporated herein by reference for all purposes, which in turn claims priority to U.S. Provisional Patent Application No. 61/408,369 entitled INTER-TRACK INTERFERENCE CANCELATION FOR SHINGLED MAGNETIC RECORDING filed Oct. 29, 2010, which is incorporated herein by reference for all purposes.

BACKGROUND OF THE INVENTION

Shingled magnetic recording (SMR) is a technique in which tracks are overlapped. For example, a shingle is created by squeezing N tracks together by making them overlap with each other. If a track overlaps another track by $\delta$, the increase in tracks per inch (TPI) TPI is given by $\delta/(1-\delta)$. This increase in TPI is attained at the cost of increased interference from side tracks as the read head will also sense or otherwise receive information from the side tracks in addition to the center track (sometimes referred to as the track of interest or the desired track). If the additional information from the side tracks is significant (e.g., because the side tracks are very close to the read head, causing a relatively large amount of side track interference to be received), it may be necessary to remove the interference from the side track(s) for successful decoding of the information bits. Although some techniques exist to remove side track interference from a read back signal, it would be desirable if improved techniques were developed which could be used in the presence of a frequency offset (e.g., an offset between the write clock of a center track and the write clock of a side track).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
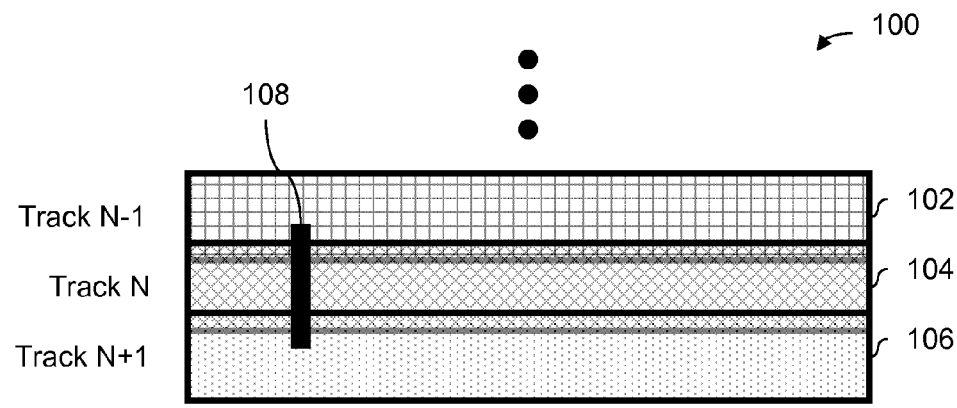
FIG. 1 is a diagram showing an embodiment of a center track and two side tracks in a shingled magnetic recording (SMR).
Figure 1:
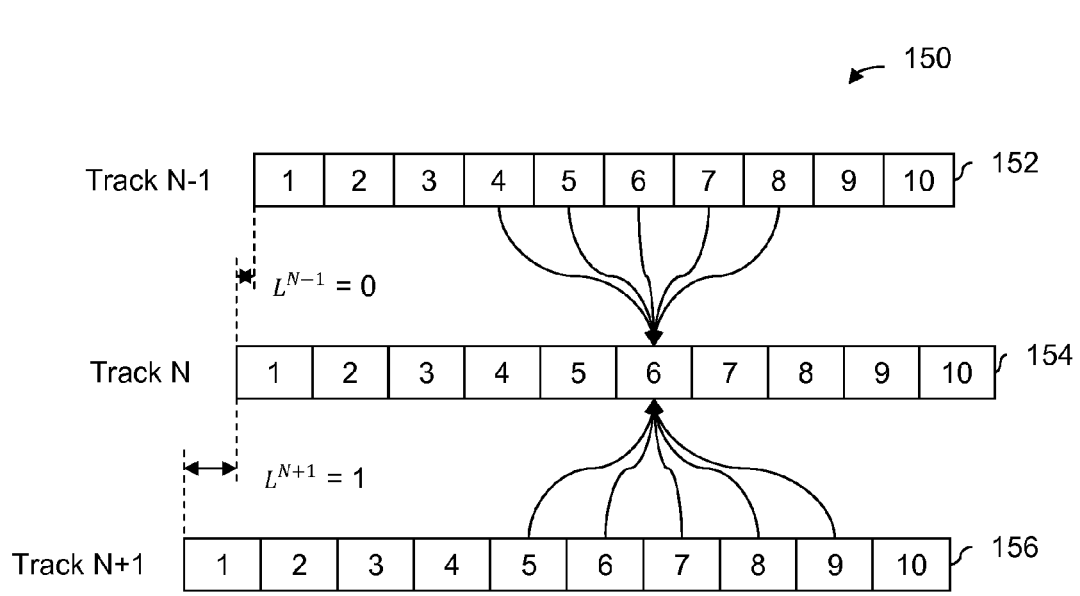

FIG. 1 is a diagram showing an embodiment of a center track and two side tracks in a shingled magnetic recording (SMR). Here, it is assumed that the center track may not be phase-aligned or frequency coherent (i.e. written with the same frequency relative to the media) with the side tracks. In the example shown, diagram 100 shows three tracks in a SMR system. Track N (104) in this example is the center track (sometimes also referred to as a desired track or track of interest). For example, data stored in track N (104) may be desired by some driver or other higher-level entity, whereas the data stored in the other tracks (i.e., tracks 102 and 106) is not necessarily desired, at least at this point in time.

In a SMR system, a read head (108) unintentionally senses the signal from the side tracks while reading the center track, causing the read back signal to include information from the side tracks in addition to the center track. See, e.g., diagram 100, where the size of read head 108 and the width and placements of tracks 102, 104, and 106 cause read head 108 to be over at least a portion of side tracks 102 and 106. The read head equalized output $y_k^N$ for center track 104 is given by:

$$y_k^N = \sum_{i=-L}^{L} h_i^N b_{k-i}^N + \sum_{i=-L}^{L} h_i^{N-1} b_{k-i-L^{N-1}}^{N-1} + \sum_{i=-L}^{L} h_i^{N+1} b_{k-i-L^{N+1}}^{N+1} \quad (1)$$

where $h_i^{N-1}$, $h_i^N$, $h_i^{N+1}$ are the equalized channel response for $(N-1)^{th}$, $N^{th}$ and $(N+1)^{th}$ track with the read-head positioned over track N, respectively, $L^{N-1}$ and $L^{N+1}$ are the relative phase mis-alignments of the $N^{th}$ track to the $(N-1)^{th}$ and $(N+1)^{th}$ track, respectively, $b_k^N$ is the bit sequence for the $N^{th}$ track, and L is length of the equalized channel response for $(N-1)^{th}$, $N^{th}$, and $(N+1)^{th}$ tracks. In ITI cancellation, these interference terms from the side tracks (i.e., the second and third summations, $\Sigma_{i=-L}^{L} h_i^{N-1} b_{k-i-L^{N-1}}^{N-1}$ and $\Sigma_{i=-L}^{L} h_i^{N+1} b_{k-i-L^{N+1}}^{N+1}$) are removed from the read back signal for improved performance, for example if there is too much side track interference and downstream error correction decoders are not able to properly decode the data.

To more clearly illustrate some of the terms in Equation (1), consider the example of diagram 150. In that example, $L^{N-1}$ represents the phase mis-alignment between tracks 152 and 154 at the beginning of the respective first bits in those tracks, and $L^{N+1}$ represents the phase mis-alignment between tracks 154 and 156 at the beginning of the respective first bits in those tracks. In embodiments described herein, $L^{N-1}$ and $L^{N+1}$ are (e.g., the closest) integer values and in the example of diagram 150, $L^{N-1}=0$ and $L^{N+1}=1$. In embodiments described herein, the values of L are integers and phase shift is specified relative to the center track bit sequence; in some other embodiments, some other (e.g., non-integer) values of L are permitted and/or the L is defined from some other point of reference. The values of $L^{N-1}$, $L^{N+1}$, and L determine which bits in the side tracks affect the read head equalized output ($y_k^N$) for the center track, at least as represented or otherwise modeled by Equation (1). In diagram 150, for example, where $L^{N-1}=0$, $L^{N+1}=1$, and the length of the equalized channel response is 5, bits 4-8 of track (N−1) (i.e., $b_{k-i-L^{N-1}}^{N-1}$ in the second summation of Equation (1)) and bits 5-9 of track (N+1) (i.e., $b_{k-i-L^{N+1}}^{N+1}$ in the third summation of Equation (1)) affect bit 6 in center track 154. The degree to which these side track bits are sensed by a read head and included in a read back signal is reflected in or otherwise modeled by the respective side track pulse shapes, $h_i^{N-1}$ and $h_i^{N+1}$.

Diagram 150 also shows how a frequency offset affects the alignment of bits in a side track compared to bits in a center track. At the beginning of the bit sequence, the side track N+1 (156) starts first, followed by the center track (154) with the N−1 side track (152) last. However, because of differences in the write clock, at the end of the sequence when the same number of bits have been written (i.e., 10 bits), the N+1 side track (156) ends first, barely edging out the N−1 side track (152) with the center track (154) ending last. In other words, the write clock of the N−1 side track is faster than that of the center track (154) (e.g., because even though it starts later it finishes first). Although not as noticeable as the difference between the center track and the N−1 side track, the write clock of the N+1 side track is slightly slower than that of the center track.

If there is frequency offset present in the side tracks, the channel pulse shapes for the side tracks will change with time. The read head equalized output $y_k^N$ for $N^{th}$ center track in presence of frequency offset is given by:

$$y_k^N = \sum_{i=-L}^{L} h_i^N b_{k-i}^N + \sum_{i=-L}^{L} h_i^{N-1}(k) b_{k-i-L^{N-1}}^{N-1} + \sum_{i=-L}^{L} h_i^{N+1}(k) b_{k-i-L^{N+1}}^{N+1} \quad (2)$$

where $h_i^{N+1}(k)$ and $h_i^{N-1}(k)$ become time dependent unlike the previous channel model. In other words, the pulse shapes $h_i^{N+1}(k)$ and $h_i^{N-1}(k)$ change over time when there is a frequency offset; an ITI cancellation technique which is capable of operating in such an environment would be desirable.

Figure 2:
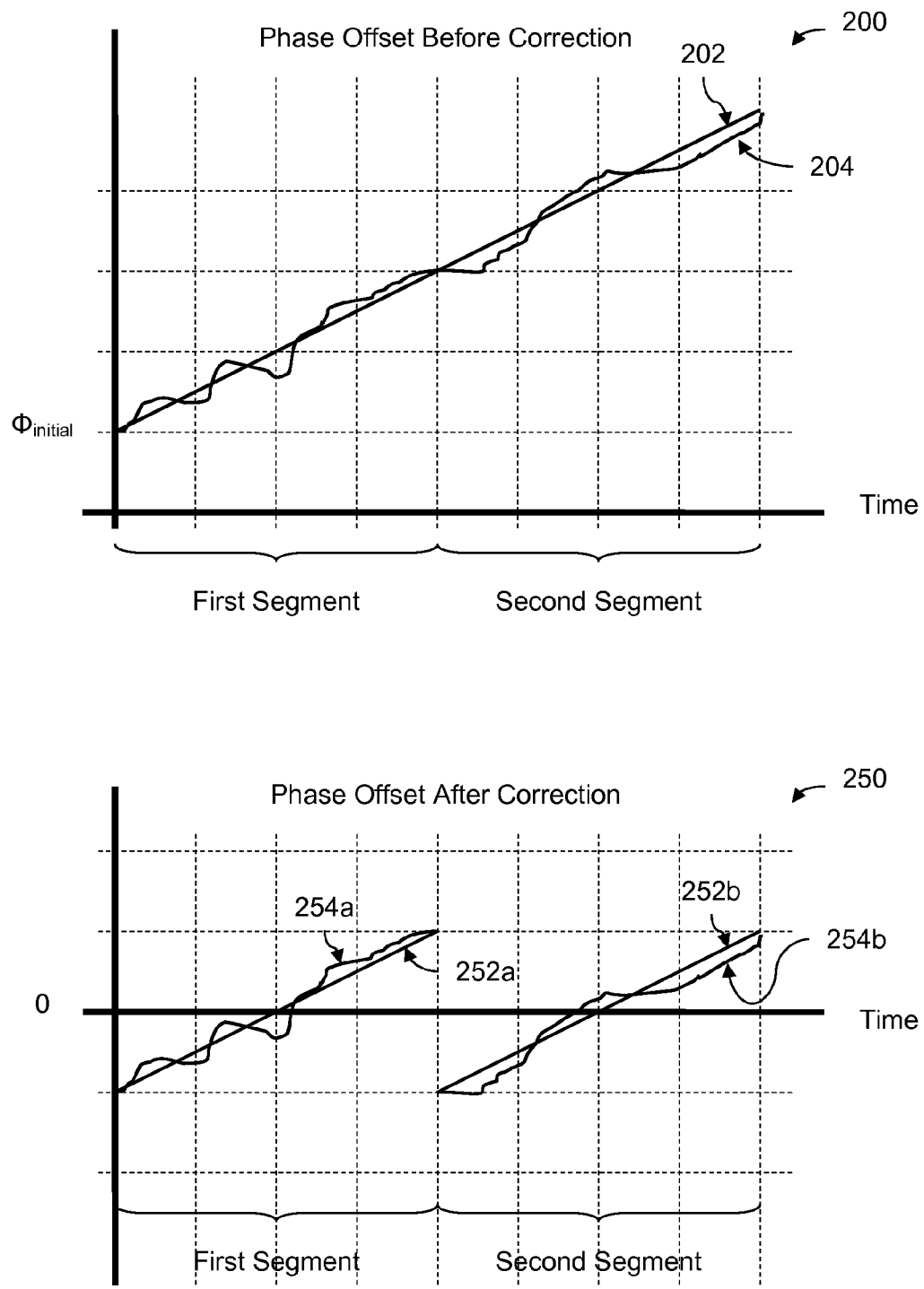
FIG. 2 is a diagram showing an example of dividing a bit sequence into multiple segments and performing a correlation-based correction technique to each segment.

FIG. 2 is a diagram showing an example of dividing a bit sequence into multiple segments and performing a correlation-based correction technique to each segment. One technique for dealing with a frequency offset (described in co-pending U.S. patent application Ser. No. 13/282,370, entitled INTER-TRACK INTERFERENCE CANCELLATION FOR SHINGLED MAGNETIC RECORDING and filed on Oct. 26, 2011), is to divide a bit sequence into multiple bit sequences and apply the correlation technique to each smaller bit sequence. In this particular example, the bit sequence is divided into two segments.

Diagram 200 shows a phase offset before correction using this correlation based technique; line 202 shows a linear phase offset which results from a (e.g., constant) frequency offset. Localized or instantaneous noise may contribute a random additional phase offset to line 202, resulting in phase offset 204.

Diagram 250 shows the phase offset after correction of the first and second segments. Since a single correction is applied to each segment, correction tends to be best at the center of each segment and worst at the edges of the segments. Lines 252a and 252b correspond to line 202 and phase offsets 254a and 254b correspond to phase offset 204.

As shown in diagram 250, this technique (when used in systems with a frequency offset) may be undesirable for a variety of reasons. Noise removal may better with a longer bit sequence (and thus dividing a bit sequence into segments may comprise noise removal), performance may be less than optimal when segments are defined ahead of time because some division other than the pre-defined one may produce better results (but on the other hand having segments determined on-the-fly may be computationally quite expensive), there may be relatively large discontinuities or shifts at the boundaries of the segments once the side track interference is removed, removal of the side track interference is best in the middle of the bit sequences as opposed to near the segment boundaries, and so on. It would therefore be desirable if new techniques could be developed which are (for example) relatively easy to implement in hardware and/or have better performance in the presence of a frequency shift.

Figure 3:
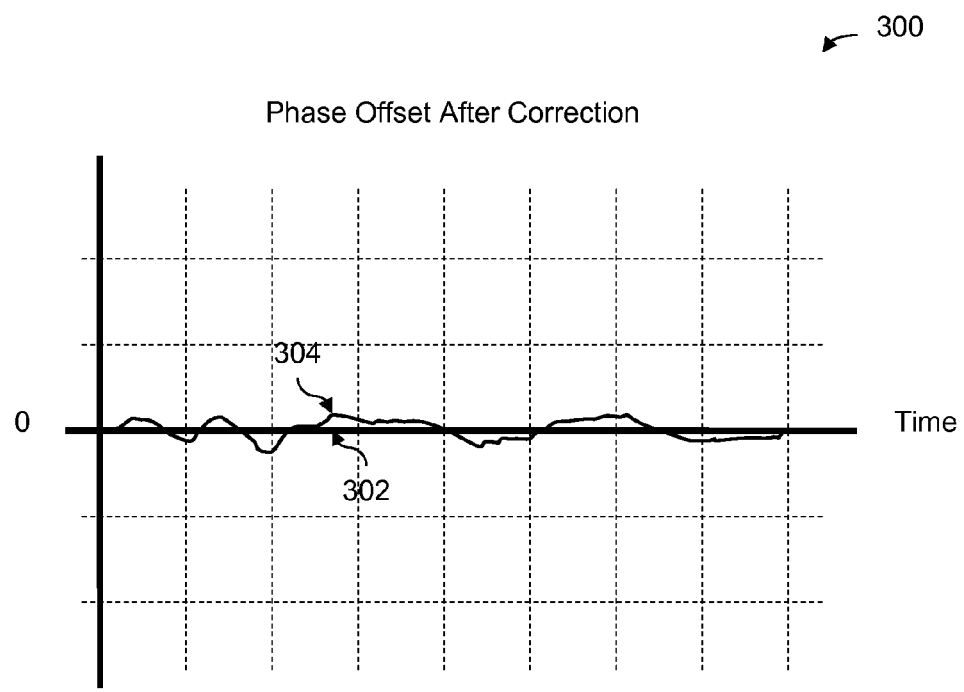
FIG. 3 is a diagram showing an embodiment of a phase offset after a correction which is based on an adaptive technique.

FIG. 3 is a diagram showing an embodiment of a phase offset after a correction which is based on an adaptive technique. In the example shown, the adaptive technique does not divide a bit sequence into multiple segments, but rather adjusts pulse shapes (i.e., $h_i^{N-1}$ and $h_i^{N+1}$) in order to minimize a figure-of-merit (e.g., which includes or represents the side track interference as modified by the pulse shapes). Post-correction line 302 corresponds to pre-correction line 202 in FIG. 2 and post-correction phase offset 304 corresponds to pre-correction phase offset in 204 in FIG. 2.

A figure-of-merit is described herein which may be used for removing the interference from one or both side tracks where there may be frequency offset present in either or both of the side tracks. In general, the figure-of-merit includes or otherwise reflects the contributions from the side tracks when attempting to read the center track, as affected or otherwise filtered by the channel. In some embodiments, to remove contributions from the side tracks, the mean square error term is minimized with respect to $h_i^{N-1}$ and $h_i^{N+1}$. Put another way, the process attempts to determine values for $h_i^{N-1}$ and/or $h_i^{N+1}$ which, when used to construct an estimate of the side-track interference terms, does so as accurately (in terms of mean squared error) as possible. By determining the values of $h_i^{N-1}$ and/or $h_i^{N+1}$ in this manner, the side track interference term(s) can be constructed accurately such that its removal from the center track waveform removes as much of this term as possible.

Figure 4:
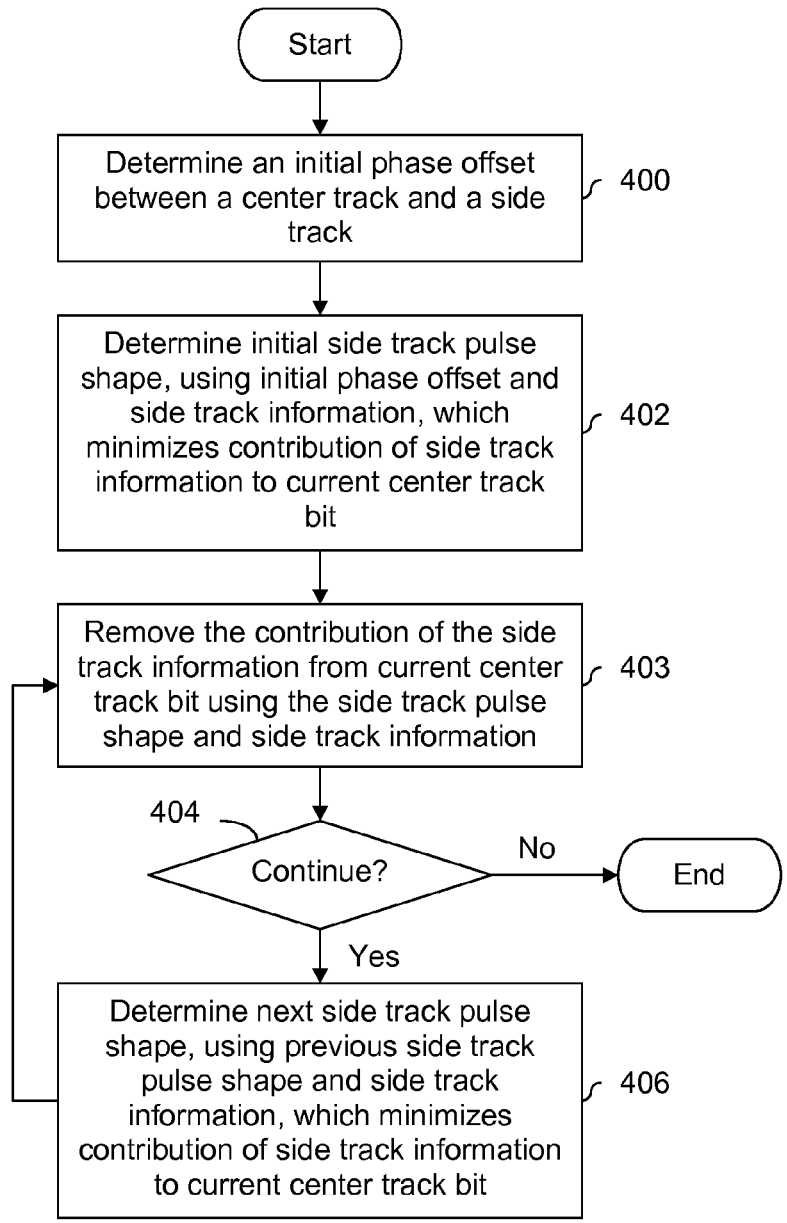
FIG. 4 is a diagram showing an embodiment of a process for an adaptive ITI cancellation process.

FIG. 4 is a diagram showing an embodiment of a process for an adaptive ITI cancellation process. For clarity, the example process describes cancellation of ITI from a single side track but the technique may be expanded to remove ITI from multiple side tracks (e.g., because side tracks are independent and do not affect one other, similarly, removal of different side tracks are independent processes). Typically, the two side tracks for a given center track have different pulse shapes and phase offset information; the example process shown below may be performed on both tracks to determine the possibly different phase offsets and possibly different pulse shapes.

At 400, an initial phase offset between a center track and a side track is determined. For example, in FIG. 2, an initial phase offset between side track N−1 (152) and center track N (154) may be determined at 400. Or, the initial phase offset between side track N+1 (156) and center track N (154) in FIG. 2 is determined at 400. In various embodiments, the number of bits in the side track and/or the number of bits in the center track which are used in estimating or calculating an initial phase offset is pre-defined, determined heuristically, etc.

At 402, an initial side track pulse shape is determined, using the initial phase offset and side track interference, which minimizes the contribution of side track interference to a current center track bit. For example, referring back to the FIG. 2, a side track pulse for track N−1 (152) which minimizes the contribution of interference from that side track is determined. Since the side track data for track N−1 (152) is known, the pulse shape which minimizes the contribution of that side track interference can be determined.

In various embodiments, a variety of techniques may be used to perform steps 400 and 402. In some embodiments, a default or pre-defined value is used. In some embodiments, an estimate or calculation is performed to obtain an initial phase offset and/or an initial side track pulse shape. In some embodiments it is assumed that an initial phase offset is zero (i.e., the adjacent tracks are assumed to be phase aligned and the initial phase offset is set to zero). In some embodiments, an estimate or calculation used to determine an initial phase offset and/or an initial side track pulse shape assumes that there is no frequency offset between the center track and side track. This may be an acceptable assumption because the data used for estimating the phase offset and side track pulse shape may often and/or typically does not contain much frequency offset. For example, a 10 ppm frequency offset implies that there will be a 1 T shift in pulse shape in 100,000 T data samples. If 5000 data samples are used for estimating pulse shape and phase offset then there will be a 0.05 T pulse shape shift which is negligible.

In some embodiments, determining an initial phase offset at 400 and/or an initial side track pulse shape at 402 includes one or more of the techniques described in co-pending U.S. patent application Ser. No. 13/282,370, entitled INTER-TRACK INTERFERENCE CANCELLATION FOR SHINGLED MAGNETIC RECORDING and filed on Oct. 26, 2011. That application describes a technique in which inter-track interference (ITI) is detected and canceled using correlation. It is assumed in that patent application that the side tracks $\bar{b}^{N-1}$ and $\bar{b}^{N+1}$ are decodable and are known. In at least some embodiments described therein, the correlation metric for the (N−1)$^{th}$ track is defined as:

$$C_m^{N-1} = \sum_{k=1}^{T} y_k^N b_{k-m}^{N-1} \quad (3)$$

where T is the number of samples used for the correlator. The values of $C_m^{N-1}$ and $C_m^{N+1}$ may be computed for different values of m lying between $-L_{max}$ to $L_{max}$ where the value of $L_{max}$ may be chosen heuristically. In some embodiments, an estimate of $h^{N-1}$ is given by:

$$\hat{h}^{N-} = [C_{\hat{m}^{N-1}}^{N-1} \ldots C_{\hat{m}^{N-1}+L}^{N-1}] \quad (4)$$

where $\hat{m}^{N-1} = \arg\max_m s_m^{N-1}$, $s_m^{N-1} = \sum_{i=0}^{L}|C_{i+m}^{N-1}|$, and L is the length of $\bar{h}^{N-1}$ which can be chosen heuristically. The estimate of $L^{N-1}$ is given by $$\hat{L}^{N-1} = \hat{m}^{N-1} + \frac{L}{2} + 1.$$

The estimates for $L^{N+1}$ and $\bar{h}^{N+1}$ can be found in a similar manner.

In some embodiments, a least mean square (LMS) technique is used at 400 to determine an initial phase offset and/or at 402 to determine an initial side track pulse shape (e.g., as an alternative to the correlation-based technique described above). In LMS:

$$\hat{h}^{LMS_{N-1}} = \arg\min_{\bar{h}^{N-1}} E[|e_k^1|^2],$$
$$\hat{h}^{LMS_{N+1}} = \arg\min_{\bar{h}^{N+1}} E|e_k^2|^2 \quad (5)$$

where $e_k^1 = y_k^N - \sum_{i=-L_{max}}^{L_{max}} h_i^{N-1} b_{k-i}^{N-1}$, $e_k^2 = y_k^N - \sum_{i=-L_{max}}^{L_{max}} h_i^{N+1} b_{k-i}^{N+1}$, and $L_{max}$ is the length of pulse shape (e.g., which is chosen heuristically). This problem can be solved through recursion and the recursion equations are given by:

$$\hat{h}_{k+1}^{LMS_{N-1}} = \hat{h}_k^{LMS_{N-1}} + \mu_3 \times e_k^3 \times \bar{b}_k^{N-1}, \hat{h}_{k+1}^{LMS_{N+1}} = \hat{h}_k^{LMS_{N+1}} + \mu_4 \times e_k^4 \times \bar{b}_k^{N+1} \quad (6)$$

where $\mu_1$ and $\mu_2$ are adaptation coefficients, $\bar{b}_k^{N-1} = [b_{k-L_{max}}^{N-1} \ldots b_{k+L_{max}}^{N-1}]$ and $\bar{b}_k^{N+1} = [b_{k-L_{max}}^{N+1} \ldots b_{k+L_{max}}^{N+1}]$. The adaptation coefficients are chosen appropriately to ensure the estimates of the pulse shape converge to the correct solution. The phase mis-alignment for (N−1)$^{th}$ track can be found through the converged recursion solution $$\hat{h}^{LMS_{N-1}} \text{ where } \hat{L}^{N-1} = \frac{L_{max}}{2} + 1 - i_{max}$$

where $i_{max} = \arg\max_i h_i \hat{h}_i^{LMS_{N-1}}$. The estimate for the phase mis-alignment for (N+1)$^{th}$ track can be found in a similar manner.

Returning back to FIG. 4, at 403, the contribution of the side track interference is removed from the current center track bit using the side track pulse shape and side track data. For example, in the embodiments associated with Equations (7) and (8), this may include $y_k^N - \sum_{i=-L}^{L} h_i^{N-1} b_{k-i-\hat{L}^{N-1}}^{N-1}$ for removing interference associated with the (N−1)th side track and/or $y_k^n - \sum_{i=-L}^{L} h_i^{N+1} b_{k-i-\hat{L}^{N+1}}^{N+1}$ for removing interference associated with the (N+1)th side track.

At 404, it is determined whether to continue the process. In some embodiments, for example, a side track pulse shape is determined for each bit in a center track, and the process continues so long as there are bits remaining in the center track. If the process continues, at 406, a next side track pulse shape is determined, using a previous side track pulse shape and side track data, which minimizes contribution of side track interference to current center track bit. In some embodiments, an LMS based technique is used.

If it is determined for the process to continue, at 406 a next side track pulse shape is determined, using previous side track pulse shape and side track interference, which minimizes the contribution of the side track interference to a current center track bit.

In some embodiments, the center track data is estimated to a reliable or sufficient degree, and a LMS process at step 406 operates on a figure-of-merit from which the (estimated) center track information is removed. In this embodiment, the estimates $\hat{b}^N$ of the information bits are present on the estimator side. It is also assumed that a significant amount of frequency offset is present which will make the pulse shape coefficients $h_i^{N+1}(k)$ and $h_i^{N-1}(k)$ time dependent. The LMS estimator recursion equation is adaptive over time and can be used in the presence of a frequency offset. The LMS estimator recursion equations are given by:

$$\hat{h}_{k+1}^{LMS_{N-1}} = \hat{h}_k^{LMS_{N-1}} + \mu_3 \times e_k^3 \times \bar{b}_k^{N-1}, \hat{h}_{k+1}^{LMS_{N+1}} = \hat{h}_k^{LMS_{N+1}} + \mu_4 \times e_k^4 \times \bar{b}_k^{N+1} \quad (7)$$

where $e_k^3 = y_k^N - \Sigma_{i=-L}^{L} h_i^N \hat{b}_{k-i}^N - \Sigma_{i=-L}^{L} h_i^{N-1} b_{k-i-\hat{L}^{N-1}}^{N-1}$, $e_k^4 = y_k^N - \Sigma_{i=-L}^{L} h_i^N \hat{b}_{k-i}^N - \Sigma_{i=-L}^{L} h_i^{N+1} b_{k-i-\hat{L}^{N+1}}^{N+1}$, $\mu_3$ and $\mu_4$ are the LMS adaptation coefficients. These recursion equations give the pulse shape estimates at each time instant and may be used to remove ITI from the center track.

In some cases, the estimates of the center track information ($\hat{b}^N$) are not available. Or, the signal to noise ratio (SNR) for that information is relatively low, which means that the estimates $\hat{b}^N$ are noisy and it would not be desirable to remove the center track information. In such cases, the LMS estimator recursion equations are given by:

$$\hat{h}_{k+1}^{LMS_{N-1}} = \hat{h}_k^{LMS_{N-1}} + \mu_5 \times e_k^5 \times \bar{b}_k^{N-1}, \hat{h}_{k+1}^{LMS_{N+1}} = \hat{h}_k^{LMS_{N+1}} + \mu_6 \times e_k^6 \times \bar{b}_k^{N+1} \quad (8)$$

where $e_k^5 = y_k^N - \Sigma_{i=-L}^{L} h_i^{N-1} b_{k-i-\hat{L}^{N-1}}^{N-1}$, $e_k^6 = y_k^N - \Sigma_{i=-L}^{L} h_i^{N+1} b_{k-i-\hat{L}^{N+1}}^{N+1}$, $\mu_5$ and $\mu_6$ are the LMS adaptation coefficients. Note that, unlike the equations for $e_k^3$ and $e_k^4$, the equations for $e_k^5$ and $e_k^6$ do not remove the term $\Sigma_{i=-L}^{L} h_i^N \hat{b}_{k-i}^N$ from the center track information ($y_k^N$). As described above, in some embodiments, gradients are used to determine the side track pulse shapes which minimize $e_k^5$ and $e_k^6$. As in the previous example, the pulse shape estimates at each time instant may be used to remove the ITI from the side track(s) from the center track. There are various other ways in which the LMS estimator problem can be formulated (e.g., first the pulse shape for the $(N-1)^{th}$ track can be detected and further used to remove its interference effect while detecting the pulse shape for $(N+1)^{th}$ track).

Figure 5:
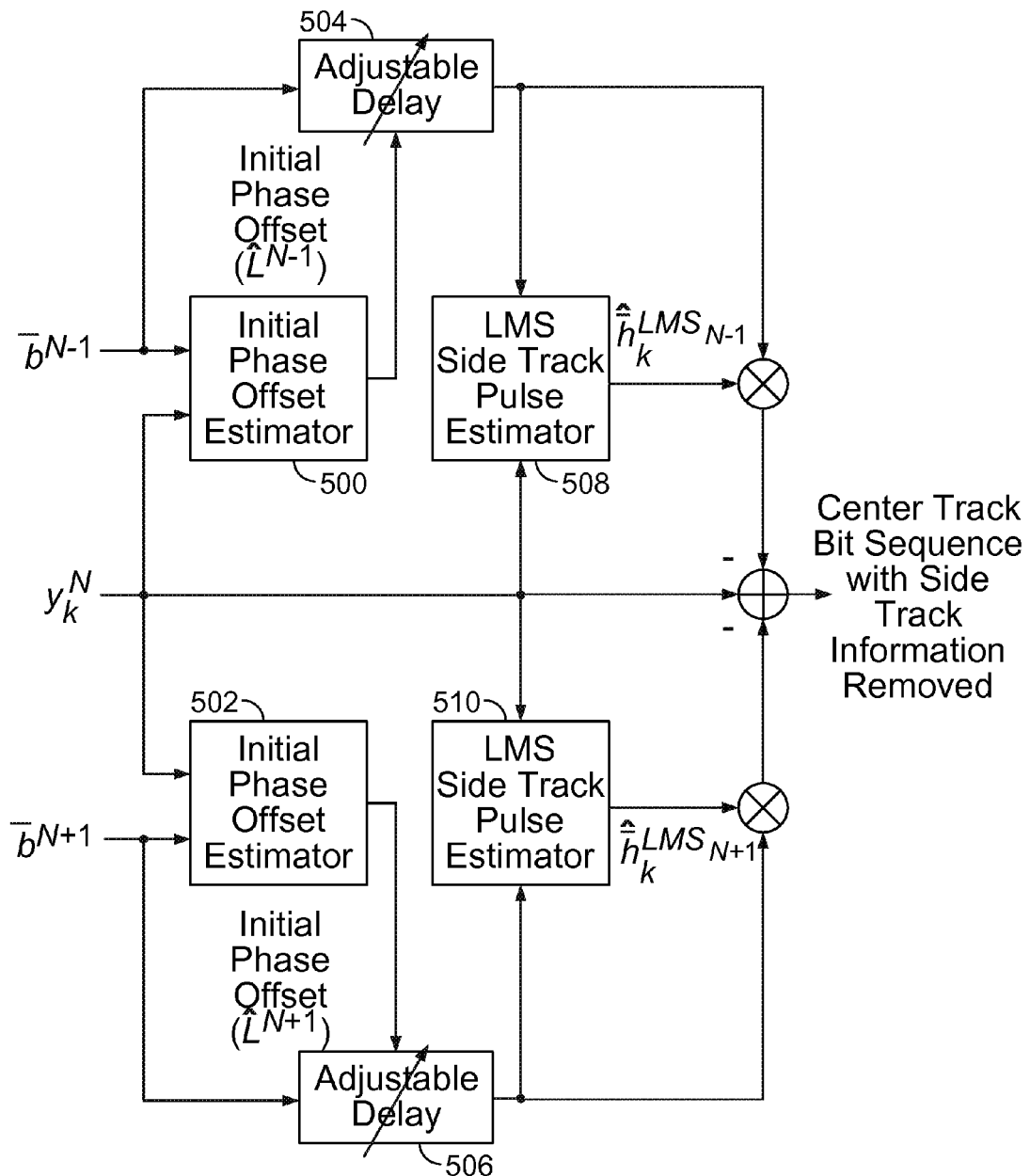
FIG. 5 is a diagram showing an embodiment of a system for removing ITI using a LMS adaptive technique.

FIG. 5 is a diagram showing an embodiment of a system for removing ITI using a LMS adaptive technique. In the example shown, the LMS system is included in a SMR system. For clarity, other components (e.g., associated with writing to the magnetic storage media) are not shown in this figure.

A signal ($y_k^N$) which includes both center track signal and interference from two side tracks is input to the system, as are the bit sequences associated with the two side tracks (i.e., $\bar{b}^{N-1}$ and $\bar{b}^{N+1}$). Initial phase offset estimators 500 and 502 output an initial phase offset for the $(N-1)^{th}$ side track and the $(N+1)^{th}$ side track. These initial phase offsets (i.e., $\hat{L}^{N-1}$ and $\hat{L}^{N+1}$) are passed to adjustable delay elements 504 and 506). Delay elements 504 and 506 delay the bit sequence of the $(N-1)^{th}$ side track and the $(N+1)^{th}$ side track, respectively, by the specified amount so that the delayed versions of the side tracks are relatively lined up with the $y_k^N$ signal (e.g., it may not be necessary to have the side tracks exactly line up with $y_k^N$; "close enough" may be sufficient).

LMS side track pulse estimators 508 and 510 received the delayed side track bit sequences as well as the $y_k^N$ signal. Using least mean squares (LMS), side track pulse shapes for the respective side tracks are generated for the $(N-1)^{th}$ side track and the $(N+1)^{th}$ side track by estimators 508 and 510, respectively. For example, estimators 508 and 510 may use the LMS estimator recursion equations shown in Equation (7) (e.g., when the center track information is known and/or has a sufficient SNR) or in Equation (8) (e.g., when the center track information is not known, or it does not have a sufficiently high SNR). Alternatively, some other embodiments use non-LMS side track pulse estimation techniques to obtain the pulse shapes. In some embodiments, a new pulse shape is generated for each bit of the signal $y_k^N$. In other words, as each bit of the signal $y_k^N$ is input, new side track pulse shapes are generated with each bit that is input.

The side track pulse shapes for the side tracks are combined with their respective, delayed bit sequence and are then removed from the $y_k^N$ signal. Ideally, the side channel bit sequences used by the system (i.e., $\bar{b}^{N-1}$ and $\bar{b}^{N+1}$) perfectly match actual side channel bit sequences and the estimated side track pulse shapes (i.e., $\hat{h}_k^{LMS_{N-1}}$ and $\hat{h}_k^{LMS_{N+1}}$) perfectly match the actual channel (e.g., based on the read arm positioning of the read arm, the positioning of the side tracks, etc.) so that the output signal has no side track interference and only center track information.

One advantage, at least with ITI cancellation systems which use LMS, is that they have relatively low complexity and can be relatively easily implemented in hardware. For example, storage controllers, such as SMR controllers, are often implemented on hardware (such as an application-specific integrated circuit (ASIC), a field-programmable gate array (FPGA), or a device with a microprocessor, such as an ARM core) and therefore ease of hardware implementation is often an important consideration.

Figure 6:
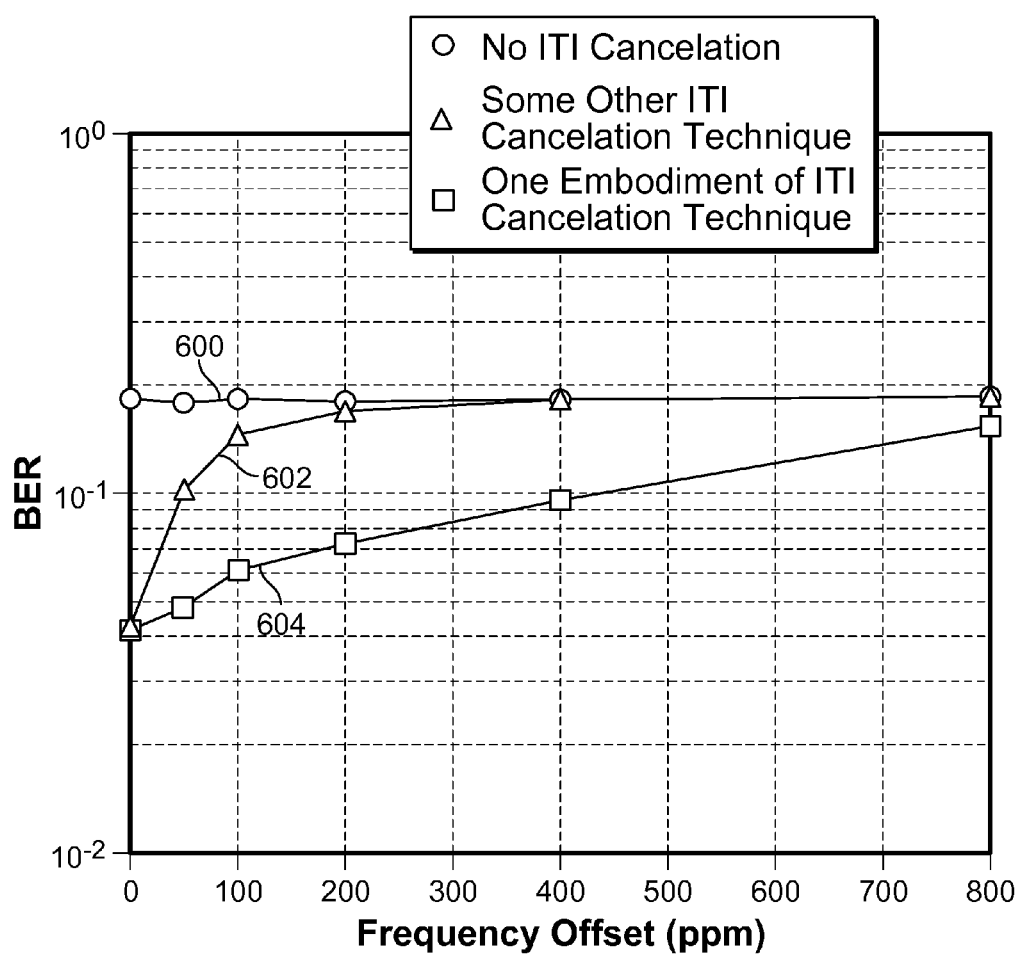
FIG. 6 is a diagram showing example bit error rates using one embodiment of the proposed technique compared to some other techniques.

FIG. 6 is a diagram showing example bit error rates using one embodiment of the proposed technique compared to some other techniques. In the example shown, a SMR system with a channel model was simulated. In the example simulation, a sector containing 40000 bits of data was overlapped with two side tracks. Different values of the frequency offset varying from 1 parts per million (ppm) to 800 ppm are used in the simulation. Bit error rate 600 (line with circle data points) shows an error rate for a system with no ITI cancellation. Bit error rate 602 (line with triangular data points) shows an error rate for a system with some other ITI cancellation technique. Bit error rate 604 (line with square data points) shows an error rate for one embodiment of the ITI cancellation technique described herein.

It is not uncommon for a system to have a frequency offset in the range of 100 ppm. At that frequency offset, the performance of the ITI cancellation technique (i.e., a BER of 0.06) is better than that of the other ITI cancellation technique (i.e., a BER of ~0.16) and the system with no ITI cancellation (i.e., a BER of ~1.9). Even when the frequency offset is significant (e.g., 800 ppm), the performance of the embodiment used in the simulation is better than that of the other ITI cancellation technique.

Figure 7:
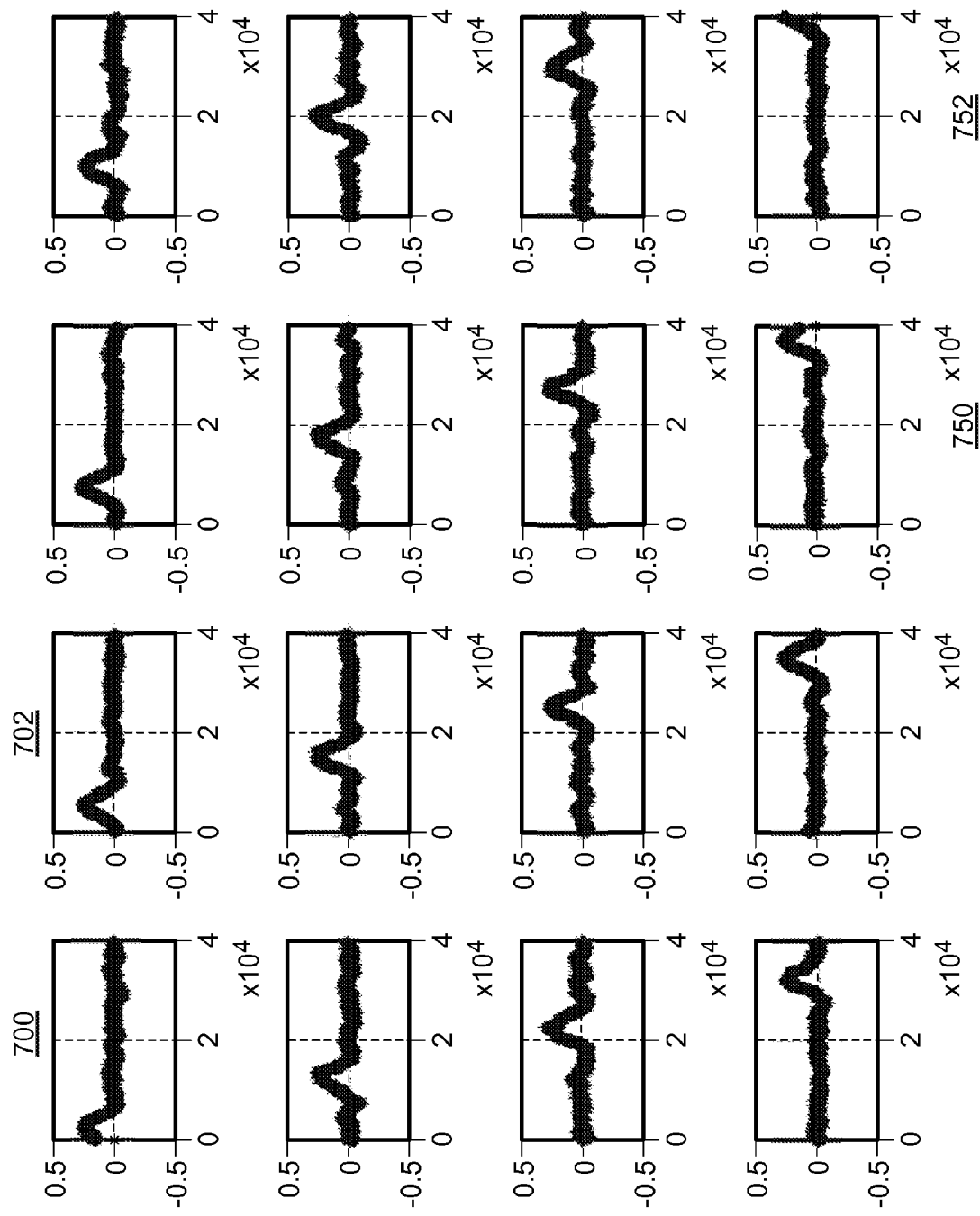
FIG. 7 is a diagram showing an embodiment of estimated pulse shapes for a side track.

FIG. 7 is a diagram showing an embodiment of estimated pulse shapes for a side track. In this example, the estimated pulse shapes were obtained by simulating a 400 ppm frequency offset present in both side tracks. As a result of the frequency offset, the pulse shapes change over time. In the example shown, the pulse shapes at 16 different points in time go from left to right and from top to bottom (i.e., pulse shape 700 corresponds to a first point in time or a first bit in a sequence, pulse shape 702 corresponds to a second point in time or a second bit in a sequence, pulse shape 750 corresponds to a second to last point in time or a second to last bit in a sequence, and pulse shape 752 corresponds to a last point in time or a last bit in a sequence). Referring back to Equation (7), pulse shape 700 is an example of $\hat{h}_0^{LMS_{N-1}}$ or $\hat{h}_0^{LMS_{N+1}}$, pulse shape 702 is an example of $\hat{h}_1^{LMS_{N-1}}$ or $\hat{h}_1^{LMS_{N+1}}$, pulse shape 750 is an example of $\hat{h}_{14}^{LMS_{N-1}}$ or $\hat{h}_{14}^{LMS_{N+1}}$, and pulse shape 752 is an example $\hat{h}_{14}^{LMS_{N+1}}$ or $\hat{h}_{15}^{LMS_{N+1}}$. In some embodiments, pulse shapes are generated for each bit in a center track (e.g., in FIG. 1, side track pulse shapes are generated for each of the 10 bits in center track 154, multiplied by two side tracks for a total of 20 (e.g., different) side track pulse shapes generated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining an initial phase offset between a center track and a side track;
   using a processor to determine an initial side track pulse shape, using the initial phase offset and side track interference, wherein the initial side track pulse shape minimizes a contribution of the side track interference to a center track bit; and
   removing the contribution of the side track interference from the center track bit using the initial side track pulse shape and the side track interference.

2. The method of claim 1, wherein the center track and the side track are associated with a shingled magnetic recording (SMR) system.

3. The method of claim 1, wherein determining the initial phase offset includes using $$\hat{L}^{N-1} = \hat{m}^{N-1} + \frac{L}{2} + 1,$$

where $\hat{m}^{N-1} = \arg\max_m s_m^{N-1}$ and $s_m^{N-1} = \Sigma_{i=0}^{L} |C_{i+m}^{N-1}|$.

4. The method of claim 1, wherein using the processor to determine the initial side track pulse shape includes using a correlation metric $C_m^{N-1} = \Sigma_{k=1}^{T} y_k^N b_{k-m}^{N-1}$, where T is a number of samples used for the correlation.

5. The method of claim 1, wherein determining the initial phase offset includes using $$\hat{L}^{N-1} = \frac{L_{max}}{2} + 1 - i_{max},$$

where $i_{max} = \arg\max_i \hat{h}_i^{LMS_{N-1}}$ and $L_{max}$ is the length of the initial side track pulse shape.

6. The method of claim 1, wherein using the processor to determine the initial side track pulse shape includes using $\hat{h}^{LMS_{N-1}} = \arg\min_{\hat{h}^{N-1}} E[|e_k^1|^2]$, where $e_k^1 = y_k^N - \Sigma_{i=-L_{max}}^{L_{max}} h_i^{N-1} b_{k-i}^{N-1}$ and $L_{max}$ is the length of the initial side track pulse shape.

7. The method of claim 1, wherein using the processor to determine the initial side track pulse shape includes using $\hat{h}_{k+1}^{LMS_{N-1}} = \hat{h}_k^{LMS_{N-1}} + \mu_1 \times e_k^1 \times \bar{b}_k^{N-1}$, where $e_k^1 = y_k^N - \Sigma_{i=-L_{max}}^{L_{max}} h_i^{N-1} b_{k-i}^{N-1}$, $L_{max}$ is the length of the initial side track pulse shape, $\mu_1$ is an adaptation coefficient, and $\bar{b}_k^{N-1} = [b_{k-L_{max}}^{N-1} \ldots b_{k+L_{max}}^{N-1}]$.

8. The method of claim 1, further comprising:
   using the processor to determine a second side track pulse shape, using the initial side track pulse shape and the side track data, wherein the second side track pulse shape minimizes the contribution of the side track interference to a second center track bit; and
   remove the contribution of the side track interference from the second center track bit using the second side track pulse shape and side track data.

9. The method of claim 8, wherein using the processor to determine the second side track pulse shape includes using $\hat{h}_{k+1}^{LMS_{N-1}} = \hat{h}_k^{LMS_{N-1}} + \mu_5 \times e_k^5 \times \bar{b}_k^{N-1}$, where $e_k^5 = y_k^N - \Sigma_{i=-L}^{L} h_i^{N-1} b_{k-i-L^{N-1}}^{N-1}$ and $\mu_5$ is an adaptation coefficient.

10. A system, comprising:
    a processor; and
    a memory coupled with the processor, wherein the memory is configured to provide the processor with instructions which when executed cause the processor to:
       determine an initial phase offset between a center track and a side track;
       determine an initial side track pulse shape, using the initial phase offset and side track interference, wherein the initial side track pulse shape minimizes a contribution of the side track interference to a center track bit; and
       remove the contribution of the side track interference from the center track bit using the initial side track pulse shape and the side track interference.

11. The system of claim 10, wherein the system is associated with shingled magnetic recording (SMR).

12. The system of claim 10, wherein the instructions for determining the initial phase offset include instructions for using $$\hat{L}^{N-1} = \hat{m}^{N-1} + \frac{L}{2} + 1,$$

where $\hat{m}^{N-1} = \arg\max_m s_m^{N-1}$ and $s_m^{N-1} = \Sigma_{i=0}^{L} |C_{i+m}^{N-1}|$.

13. The system of claim 10, wherein the instructions for determining the initial side track pulse shape include instructions for using a correlation metric $C_m^{N-1} = \Sigma_{k=1}^{T} y_k^N b_{k-m}^{N-1}$, where T is a number of samples used for the correlation.

14. The system of claim 10, wherein the instructions for determining the initial phase offset include instructions for using $$\hat{L}^{N-1} = \frac{L_{max}}{2} + 1 - i_{max},$$

where $i_{max} = \arg\max_i \hat{h}_i^{LMS_{N-1}}$ and $L_{max}$ is the length of the initial side track pulse shape.

15. The system of claim 10, wherein the instructions for determining the initial side track pulse shape include instructions for using $\hat{h}^{LMS_{N-1}} = \arg\min_{\hat{h}^{N-1}} E[|e_k^1|^2]$, where $e_k^1 = y_k^N - \Sigma_{i=-L_{max}}^{L_{max}} h_i^{N-1} b_{k-i}^{N-1}$ and $L_{max}$ is the length of the initial side track pulse shape.

16. The system of claim 10, wherein the instructions for determining the initial side track pulse shape include instructions for using $\hat{h}_{k+1}^{LMS_{N-1}} = \hat{h}_k^{LMS_{N-1}} + \mu_1 \times e_k^1 \times \bar{b}_k^{N-1}$, where $e_k^1 = y_k^N - \Sigma_{i=-L_{max}}^{L_{max}} h_i^{N-1} b_{k-i}^{N-1}$, $L_{max}$ is the length of the initial side track pulse shape, $\mu_1$ is an adaptation coefficient, and $\bar{b}_K^{N-1} = [b_{k-L_{max}}^{N-1} \ldots b_{k+L_{max}}^{N-1}]$.

17. The system of claim 10, wherein the memory is further configured to provide the processor with instructions which when executed cause the processor to:
- determine a second side track pulse shape, using the initial side track pulse shape and the side track interference, wherein the second side track pulse shape minimizes the contribution of the side track interference to a second center track bit; and
- remove the contribution of the side track interference from the second center track bit using the second side track pulse shape and side track data.

18. The system of claim 17, wherein using the processor to determine the second side track pulse shape includes using $\hat{h}_{k+1}^{LMS_{N-1}} = \hat{h}_k^{LMS_{N-1}} + \mu_5 \times e_k^5 \times \bar{b}_k^{N-1}$, where $e_k^5 = y_k^N - \Sigma_{i=-L}^{L} h_i^{N-1} b_{k-i-L'}^{N-1}$ and $\mu_5$ is an adaptation coefficient.

19. A computer program product, the computer program product being embodied in a non-transitory computer readable storage medium and comprising computer instructions for:
- determining an initial phase offset between a center track and a side track;
- using a processor to determine an initial side track pulse shape, using the initial phase offset and side track interference, wherein the initial side track pulse shape minimizes a contribution of the side track interference to a center track bit; and
- removing the contribution of the side track interference from the center track bit using the initial side track pulse shape and the side track interference.

20. The computer program product of claim 19, wherein the center track and the side track are associated with a shingled magnetic recording (SMR) system.

\* \* \* \* \*

UNITED STATES PATENT AND TRADEMARK OFFICE
CERTIFICATE OF CORRECTION

PATENT NO. : 8,659,846 B2
APPLICATION NO. : 13/448218
DATED : February 25, 2014
INVENTOR(S) : Naveen Kumar Page 1 of 2

It is certified that error appears in the above-identified patent and that said Letters Patent is hereby corrected as shown below:

Claims

In column 9, line 45, claim 3 delete "$s_m^{N-1} = \Sigma_{i=0}^L |C_{i+m}^{N-1}|$," and insert -- $s_m^{N-1} = \Sigma_{i=0}^L |C_{i+m}^{N-1}|$ --, therefor.

In column 9, line 48, claim 4 delete "$C_m^{N-1} = \Sigma_{k=1}^T y_k^N b_{k-m}^{N-1}$," and insert -- $C_m^{N-1} = \Sigma_{k=1}^T y_k^N b_{k-m}^{N-1}$ --, therefor.

In column 9, line 61, claim 6 delete "$e_k^1 = y_k^N - \Sigma_{i=-L_{max}}^{L_{max}} h_i^{N-1} b_{k-i}^{N-1}$" and insert -- $e_k^1 = y_k^N - \Sigma_{i=-L_{max}}^{L_{max}} h_i^{N-1} b_{k-i}^{N-1}$ --, therefor.

In column 9, line 67, claim 7 delete "$\Sigma_{i=-L_{max}}^{L_{max}} h_i^{N-1} b_{k-i}^{N-1}$" and insert -- $\Sigma_{i=-L_{max}}^{L_{max}} h_i^{N-1} b_{k-i}^{N-1}$ --, therefor.

In column 10, line 2, claim 7 delete "$\bar{b}_k^{N-1} = [b_{k-L_{max}}^{N-1} \ldots b_{k+L_{max}}^{N-1}]$," and insert -- $\bar{b}_k^{N-1} = [b_{k-L_{max}}^{N-1} \ldots b_{k+L_{max}}^{N-1}]$ --, therefor.

In column 10, line 14, claim 9 delete "$\hat{h}_{k+1}^{LMS_{N-1}} = \hat{h}_k^{LMS_{N-1}} + \mu_5 \times e_k^5 \times \bar{b}_k^{N-1}$" and insert -- $\hat{h}_{k+1}^{LMS_{N-1}} = \hat{h}_k^{LMS_{N-1}} + \mu_5 \times e_k^5 \times \bar{b}_k^{N-1}$ --, therefor.

In column 10, line 14, claim 9 delete "$e_k^5 = y_k^N - \Sigma_{i=-L}^L h_i^{N-1} b_{k-i-L^{N-1}}^{N-1}$" and insert -- $e_k^5 = y_k^N - \Sigma_{i=-L}^L h_i^{N-1} b_{k-i-L^{N-1}}^{N-1}$ --, therefor.

In column 10, line 41, claim 12 delete "where $\hat{m}^{N-1} = \arg\max_m s_m^{N-1}$ and $s_m^{N-1} = \Sigma_{i=0}^L |C_{i+m}^{N-1}|$," and insert -- $\hat{m}^{N-1} = \arg\max_m s_m^{N-1}$ and $s_m^{N-1} = \Sigma_{i=0}^L |C_{i+m}^{N-1}|$ --, therefor.

Signed and Sealed this
Sixteenth Day of February, 2016

Michelle K. Lee
*Director of the United States Patent and Trademark Office*

CERTIFICATE OF CORRECTION (continued)
U.S. Pat. No. 8,659,846 B2

Claims

In column 10, line 45, claim 13 delete "$C_m^{N-1} = \Sigma_{k=1}^T y_k^N b_{k-m}^{N-1}$" and insert -- $C_m^{N-1} = \sum_{k=1}^T y_k^N b_{k-m}^{N-1}$ --, therefor.

In column 10, line 60, claim 15 delete "$e_k^1 = y_k^N - \Sigma_{i=-L_{max}}^{L_{max}} h_i^{N-1} b_{k-i}^{N-1}$" and insert -- $e_k^1 = y_k^N - \sum_{i=-L_{max}}^{L_{max}} h_i^{N-1} b_{k-i}^{N-1}$ --, therefor.

In column 10, line 64, claim 16 delete "$\hat{h}_{k+1}^{LMS_{N-1}} = \hat{h}_k^{LMS_{N-1}} + \mu_1 \times e_k^1 \times \bar{b}_k^{N-1}$" and insert -- $\hat{h}_{k+1}^{LMS_{N-1}} = \hat{h}_k^{LMS_{N-1}} + \mu_1 \times e_k^1 \times \bar{b}_k^{N-1}$ --, therefor.

In column 10, line 65, claim 16 delete "$e_k^1 = y_k^N - \Sigma_{i=-L_{max}}^{L_{max}} h_i^{N-1} b_{k-i}^{N-1}$" and insert -- $e_k^1 = y_k^N - \sum_{i=-L_{max}}^{L_{max}} h_i^{N-1} b_{k-i}^{N-1}$ --, therefor.

In column 10, line 67, claim 16 delete "$\bar{b}_k^{N-1} = [b_{k-L_{max}}^{N-1} \ldots b_{k+L_{max}}^{N-1}]$" and insert -- $\bar{b}_k^{N-1} = \left[b_{k-L_{max}}^{N-1} \ldots b_{k+L_{max}}^{N-1}\right]$ --, therefor.

In column 11, line 14, claim 18 delete "$\hat{h}_{k+1}^{LMS_{N-1}} = \hat{h}_k^{LMS_{N-1}} + \mu_5 \times e_k^5 \times \bar{b}_k^{N-1}$" and insert -- $\hat{h}_{k+1}^{LMS_{N-1}} = \hat{h}_k^{LMS_{N-1}} + \mu_5 \times e_k^5 \times \bar{b}_k^{N-1}$ --, therefor.

In column 11, line 14, claim 18 delete "$e_k^5 = y_k^N - \Sigma_{i=-L}^{L} h_i^{N-1} b_{k-i-L^{N-1}}^{N-1}$" and insert -- $e_k^5 = y_k^N - \sum_{i=-L}^{L} h_i^{N-1} b_{k-i-L^{N-1}}^{N-1}$ --, therefor.